US012573071B2

(12) United States Patent
Dinesen et al.

(10) Patent No.: US 12,573,071 B2
(45) Date of Patent: Mar. 10, 2026

(54) VISION SYSTEM FOR OBJECT DETECTION, RECOGNITION, CLASSIFICATION AND TRACKING AND THE METHOD THEREOF

(71) Applicant: UbiqiSense Aps, Copenhagen (DK)

(72) Inventors: Palle Geltzer Dinesen, Dyssegard (DK); Boris Stankovic, Copenhagen (DK); Per Eld Ibsen, Copenhagen (DK); Mohammad Tavakoli, Copenhagen (DK); Christoffer Gøthgen, Copenhagen (DK)

(73) Assignee: UbiqiSense Aps, Copenhagen (DK)

( * ) Notice: Subject to any disclaimer, the term of this patent is extended or adjusted under 35 U.S.C. 154(b) by 646 days.

(21) Appl. No.: 17/963,126

(22) Filed: Oct. 10, 2022

(65) Prior Publication Data

US 2023/0145405 A1 May 11, 2023

Related U.S. Application Data

(63) Continuation of application No. 16/772,790, filed as application No. PCT/DK2018/050350 on Dec. 12, 2018, now Pat. No. 11,501,519.

(30) Foreign Application Priority Data

Dec. 13, 2017 (DK) ............................ PA 2017 70932

(51) Int. Cl.
*G06T 7/70* (2017.01)
*G06T 7/80* (2017.01)
(Continued)

(52) U.S. Cl.
CPC .................. *G06T 7/70* (2017.01); *G06T 7/80* (2017.01); *G06V 10/462* (2022.01); *G06V 20/52* (2022.01); *G06V 10/513* (2022.01)

(58) Field of Classification Search
CPC ..... G06T 7/70–77; G06T 7/80; G06V 10/462; G06V 10/513; G06V 20/52
See application file for complete search history.

(56) References Cited

U.S. PATENT DOCUMENTS 10,853,942 B1 * 12/2020 Boyd ........................ G06T 7/80
2005/0036659 A1 2/2005 Talmon et al.
(Continued)

FOREIGN PATENT DOCUMENTS

CN 103204123 A * 7/2013
EP 1916639 A2 4/2008
(Continued)

OTHER PUBLICATIONS

Hua, Chunsheng & Makihara, Yasushi & Yagi, Yasushi & Iwasaki, Shun & Miyagawa, Keisuke & Li, Bo. (2015). Onboard monocular pedestrian detection by combining spatio-temporal hog with structure from motion algorithm. Machine Vision and Applications. 26:161-183, 10.1007/s00138-014-0653-y.

*Primary Examiner* — Casey L Kretzer
(74) *Attorney, Agent, or Firm* — Dykema Gossett PLLC

(57) ABSTRACT

The present invention relates to a method 100 for object detection (140), recognition, classification and tracking using a distributed networked architecture comprising one or more sensor units (20) wherein the image acquisition and the initial feature extraction are performed and a gateway processor (30) for further data processing. The present invention also relates to a vision system (10) for object detection (140) wherein the method may be implemented, to the devices of the vision system (10), and to the algorithms implemented in the vision system (10) for executing the method acts.

19 Claims, 7 Drawing Sheets

(51) Int. Cl.
  *G06V 10/40*        (2022.01)
  *G06V 10/46*        (2022.01)
  *G06V 20/52*        (2022.01)

(56)                   References Cited

U.S. PATENT DOCUMENTS

| | | |
|---|---|---|
| 2006/0072014 A1 | 4/2006 | Geng et al. |
| 2009/0195382 A1 | 8/2009 | Hall |
| 2016/0286171 A1 | 9/2016 | Cheng et al. |
| 2017/0053392 A1* | 2/2017 | Sun ..................... H04N 13/271 |
| 2017/0076195 A1 | 3/2017 | Yang et al. |
| 2017/0104915 A1 | 4/2017 | Adachi |
| 2017/0169570 A1 | 6/2017 | Vashishtha et al. |
| 2017/0280079 A1 | 9/2017 | Fu et al. |

FOREIGN PATENT DOCUMENTS

| | | | |
|---|---|---|---|
| EP | 2704052 A1 | 3/2014 | |
| WO | WO-2014114663 A1 * | 7/2014 | ........... G01B 11/245 |

* cited by examiner

VISION SYSTEM FOR OBJECT DETECTION, RECOGNITION, CLASSIFICATION AND TRACKING AND THE METHOD THEREOF

FIELD OF THE INVENTION

The present invention relates to a method for object detection, recognition and tracking using a distributed networked architecture comprising one or more sensor units, wherein the image acquisition, object detection and the initial feature extraction are performed, and a gateway processor for further data processing. The present invention also relates to a vision system wherein the method may be implemented, to the devices of the system, and to the algorithms implemented in the system for executing the method acts.

BACKGROUND OF THE INVENTION

With the emergence of Internet of Things (IoT) and an ever increasing number of sensors, the load on required bandwidth is in general expected to increase rapidly.

Especially the increasing use of computer vision technology may give rise to large bandwidth requirements depending on the image quality, frame rate and image processing.

Vision technology is already today used for many different applications and in a broad range of technologies. Operation of machinery including tasks such as control end feedback is a common application. Surveillance and detection are two other common applications amongst others, and the purposes and the use are continuously expanding.

The use of sensors and vision technology in IoT cause a concern of data privacy in the public and for the private consumer. Data privacy may here simply be referred to as privacy.

Today, computer vision sensors such as cameras with build-in processing exist where all the image processing is performed inside the sensor. Such sensors are generally used where the bandwidth capacity is limited. In addition to the low bandwidth requirements, the sensors may provide for privacy as there is no need to transmit image frames from the sensor for further processing. However, such sensors may require rather expensive processors to be able to perform complete analysis on the images at a required frame rate. And the requirements for the processor may even reach further to include other tasks such as machine learning for object detection, classification and recognition.

A vision system using built-in processor vision systems may be built as low bandwidth systems with integrated privacy as no image frames are to be transmitted from each computer vision sensor to a main or cloud server. Such systems may however be cost-intensive due to the processor requirements.

A different approach is to build a vision system where all image processing is performed on a main or cloud server and simple low-cost sensors with limited processor capacity may be used. Using such systems may however require high bandwidth transmission from each sensor to the server as the image frames are transmitted directly to the server. Furthermore, no privacy is ensured in such systems simply by the used method and/or equipment, contrary to systems using sensors with build-in processing.

US2009/0195382 discloses a method for and a system to detect intrusion into a protected area. The system comprises a distributed architecture of video sensors and an external processor (server). Image data is captured and processed to create a reduced image dataset, having a lower dimensionality than the captured image data. The reduced image dataset is transmitted to a centralized alarm processing device where the reduced image dataset is evaluated to determine an alarm condition which includes identification and classification of objects and/or events.

The pre-processing of the images in the video sensors results in a reduced dataset being a mathematical representation of salient features of the image. The salient features are found by a method where the background is removed, including background objects. Thus, the reduced dataset only includes data relating to foreground objects. The reduced dataset is then transmitted to the centralized alarm processing device for further processing for detecting an alarm condition. This includes classification and identification of the salient features. The effect of the described system and the method thereof is to adequately balance the processor capacity and power consumption of the video sensors with a low communication bandwidth.

OBJECT OF THE INVENTION

It is an objective to overcome one or more of the before mentioned shortcomings of the prior art. One objective is to achieve a vision system and a method hereof with build-in data privacy and low bandwidth requirements by only transmitting reduced datasets of captured images. The reduced datasets may be reduced to only comprise data of detected objects.

DESCRIPTION OF THE INVENTION

An object of the invention may be achieved by a method for object detection comprising acts performed in a sensor unit and an act performed in a gateway processor. The acts performed in the sensor unit may be acquiring an image from a camera, and performing image pre-processing on the acquired image to generate a pre-processed image. A further act performed in the sensor unit may be performing object detection in the pre-processing image using a computer vision detection algorithm. Yet a further act performed in the sensor unit may be performing data feature extraction on the detected object(s) in the pre-processed image using a computer vision DFE algorithm to generate a reduced dataset comprising extracted data features. Yet a further act performed in the sensor unit may be transmitting the reduced dataset to a gateway processor.

The act performed in the gateway processor may be receiving a reduced dataset on the gateway processor.

In the following, computer vision detection algorithm may be referred to simply as detection algorithm. In the following, computer vision DFE algorithm may be referred to simply as vision algorithm. In the following, Data Feature Extraction may be abbreviated to DFE.

The method provides for distributed image processing based on Data Feature Extraction (DFE) wherein only a reduced dataset is transmitted between the single units, which may be the sensor unit, and the gateway processor. This may be advantageous in regard to achieving a method requiring a reduced network bandwidth for transmitting only the reduced dataset.

The data feature extraction may be performed using information from the performed object detection. The reduced dataset may comprise information of the extracted data features alone or a combination of the extracted data features and the performed object detection. A dataset comprising information of the performed object detection may be transmitted to the gateway processor as a separate dataset.

Object detection may be understood as object identification. For example the object detection may detect a face. Another example may be that the object is detected as a cup, a paper, a chair, a car. Subsequently, features may be extracted from the detected object for more specific classification or recognition in later processes. A further effect of the method may be that the acts performed in the sensor unit extracts only the most necessary or crucial data from the acquired image to be comprised in the reduced dataset. The reduced dataset may later be used to determine for example object classification and/or recognition amongst others. However, the reduced dataset to be transmitted from the sensor unit to the gateway processer cannot be used to reconstruct the original image which was acquired by the camera. A further advantage of the method may be to secure data privacy due to the character of the reduced dataset.

The reduced dataset may comprise sufficient information which may be used for motion and object detection including body and face detection, face recognition, object classification, object counting amongst others as this is a non-exhaustive list.

A further object of the invention may be achieved by the method wherein the act performed in the sensor unit of 'performing image pre-processing on the acquired image', comprises the acts of obtaining one or more sub-frame images within a full-frame image where the full-frame image is the acquired image, and generating pre-processed image(s) of the one or more sub-frame images.

This embodiment may be referred to as Image splitting.

This further embodiment may have the further effect that the object detection and data feature extraction may be performed only on a sub-image and thus only generate a reduced dataset of the sub-images, thereby achieving a distribution of these tasks in time by sequentially using only a sub-image of the full image and performing the object detection and dataset reduction on that sub-image. This may provide for an initial low-computational power processing of the sub-images for obtaining the reduced dataset comprising only data which makes the reduced dataset sufficient to be under-stood by a machine learning model—rendering the transmitted data meaningless to the human eye.

Thus, the privacy of the on-device feature extraction can be maintained by performing an initial low-computational power processing of the sub-images.

In a further embodiment, the method may comprise a further act performed in the gateway processor, which act performs object recognition and/or object classification by feeding the reduced dataset into a machine learning model executing a machine learning algorithm adapted to perform object recognition based on the reduced dataset.

This embodiment may be referred to as Machine learning.

The machine learning model may be pre-trained by use of multiple training images. The machine learning model may be continuously trained based on the continuously performed object recognition and/or object classification in the reduced dataset and/or by additional use of training images.

One further effect of this further embodiment is that object recognition and/or object classification may be performed on a different unit than the unit acquiring the image using only extracted data features thereby achieving to perform object recognition and/or object classification while securing data privacy due to the character of the reduced dataset. Thus object recognition and/or object classification are performed on the reduced dataset comprising only data that are sufficient to be understood by a machine learning model, with said data being meaningless to the human eye.

The object recognition may be performed using only the extracted data features or in combination with the information retrieved by the performed object detection which may also be referred to as object features or detected object data.

The object recognition may be performed on any suitable object which may be identified as individual objects based on one or more data extracted features for that individual object within a class of objects. The extracted data features may be based on high contrast areas, areas of changing of colours, sizes and/or patterns in the object. The extracted data features may be based on object features with high contrasts within the object feature or with high contrast to the background.

One example could be for recognition of faces where the extracted features are the contrasts found in different areas of the face or in the object features. The object features such as the nose, the eyes, the eyebrows, just to mention a few object features in a non-exhaustive list. The individual object may be Mr. X and the class of objects may be people in general or a minor group e.g. employees at company Y.

Another example could be for recognition of individual car number plates where the characteristic features may be the number on the plates and the class of objects is car number plates.

Yet another example could be for recognition of persons using detection of the movement of the body. The examples are merely meant for illustrative purposes and only as examples and the object recognition is by no means limited to the mentioned examples.

Yet another example could be to identify gestures, behaviour and/or facial expressions. Such information could be beneficial in analysing customer attraction to a shopping window or a billboard. Alternatively, such information could be beneficial for analysing the behaviour of passengers at the entrance of metro stations, in indoor queues or in comparable situations. The gateway processor in the vision system cannot access the individual frames, however, as the distributed sensor units are responsible for locally identifying and tracking entities and preparing the pre-processed data to the gateway, the gateway would be able to use the pre-processed data to attach behavioural patterns to the detected entities. The reduced dataset may be processed in the gateway to represent and record such behavioural information e.g. in the form of heat-maps, traffic curves, event counting, or similar ways.

The gateway may transmit its intermediate data to other local processing units or to the cloud, for such representations and recordings.

In a further embodiment, the method may comprise further acts performed in the sensor unit and/or in the gateway processor of acquiring a pixel object height of a detected object from the reduced dataset, and comparing the pixel object height with tabulated physical object height(s) and tabulated camera parameter(s), to approximate the distance of the detected object(s) to the camera being the object-camera distance.

In an alternative embodiment, the method may comprise further acts performed in the sensor unit and/or in the gateway processor of acquiring a pixel object height of a detected object, and comparing the pixel object height with tabulated physical object height(s) and tabulated camera parameter(s), to approximate the distance of the detected object(s) to the camera being the object-camera distance.

These embodiments may be referred to as Distance estimation.

One effect of this further embodiment may be to locate individual objects using a single image. This has the advantage that a 3D localization of the objects may be achieved using a single camera. Furthermore, by combining object detection of multiple objects in one image, it may be possible to determine more properties of the individual objects. One example, for non-limiting and illustrative purposes only, could be the detection of a human where the detection of a face and detection of a body may be compared in height to evaluate if the person is sitting or standing. Furthermore, using the object-camera distance in a sequence of images in time may be advantageous in regard to achieve motion tracking of the object.

In a further embodiment, the method may comprise a further act performed in the sensor unit or in the gateway processor of acquiring a feature point and a centre point in a feature plane, the feature plane being parallel to the image plane of the sensor unit, to approximate an object-camera angle from the centre point to the feature point.

This embodiment may be referred to as Angle estimation.

One effect of this further embodiment may be to locate individual objects. This may be performed in a single image. The angle estimation may be used in combination with the Distance estimation for a more precise location of an individual object. This has the advantage that a 3D localization of the objects may be achieved using a single camera. Alternatively, the Angle estimation may be used on one object, using two sensors with overlapping fields of view and triangulation, for a more precise object location. This may be advantageous to determine more properties of the individual objects. One example, for non-limiting and illustrative purposes only, could be detecting the orientation of a face or body.

The present invention relates to different aspects. One aspect is the method described above, other aspects may include devices, algorithms, systems and/or further method acts, each yielding one or more of the effects and advantages described in connection with the already mentioned aspect, i.e. the method and the embodiments of this described above. Each aspect may have embodiments corresponding to the embodiments described in connection with the other mentioned aspect.

An object of the invention may be achieved by a sensor unit comprising means adapted to execute the acts of the method performed in the sensor unit comprising a camera adapted for acquiring an image. The sensor unit further comprises preprocessor means adapted for executing image pre-processing, executing object detection, and executing data feature extraction for generating a reduced dataset comprising extracted data features. Furthermore, the sensor unit comprises camera communication means adapted for transmitting a reduced dataset.

The camera in the sensor unit may be integrated in an embedded electronics device This may be referred to as a system on a chip (Soc). The embedded electronics device may comprise a CPU, GPU, FPGA, ASIC or similar type of system. The system may be integrated with customized vision processors.

One effect of this embodiment is that only a reduced dataset may be transmitted from the sensor unit. The reduced dataset may only comprise the most necessary or crucial data from the acquired image. As previously mentioned, due to the character of the reduced dataset, the sensor unit embodiment may be advantageous in regard to achieving a build-in data privacy of the dataset to be transmitted.

Furthermore, the reduced dataset is advantageous in regard to reduced data transmission and thus lower bandwidth requirements of the sensor communication means.

A further effect of the embodiment is that the object detection and dataset reduction may be distributed in time by sequentially using only sub-images of the full image. This may provide for an initial low-computational power processing of the sub-images for obtaining the reduced dataset.

The embodiment of the sensor unit further provides for a unit to be used in a distributed networked architecture where the sensor unit acts as a separate node where the image acquisition and initial feature extraction is performed. Furthermore, because of the character of the reduced dataset and the embodiment for distance estimation, the sensor unit may be used to achieve 3D localisation and motion detection.

An object of the invention may be achieved by a computer vision DFE algorithm comprising instructions to cause the sensor unit to execute the act of the method of performing data feature extraction on a pre-processed image to generate a reduced dataset comprising extracted data features.

The image pre-processing may be performed using common computer vision filters such as HOG, LBP, HAAR, DoG, PCA, SIFT, HCD, SIFT, SURF, ORB or similar filters.

The image pre-processing may be performed using background subtraction models.

The data feature extraction (DFE) may be based on one or more methods using spatial filtering and/or convoluted neural network(s). The DFE may be performed using any one of the algorithms Sobel, LBP, HAAR, HOG or similar algorithms.

The machine learning may be implemented by use of SVM, KNN, rCNN or similar methods.

The examples are by no means meant as a limiting feature and should be regarded simply as examples.

One effect of this embodiment is that the data features are extracted using a data feature extraction method which may not be shared and/or transmitted along with the reduced dataset. As the used data feature extraction method is not known in the transmission and/or on the unit to receive and/or process a reduced dataset to be transmitted, it is impossible to reconstruct the original image.

This means that data privacy may be secured only due to the character of the reduced dataset.

In a further embodiment, the computer vision DFE algorithm may be further adapted to perform object tracking of one or more detected objects in one or more pre-processed images in one or more subsequent acquired images.

One effect of this embodiment is that the object detection and/or data feature extraction for obtaining dataset reduction may be distributed in time by sequentially using only one sub-frame image of the full-frame image. The one sub-frame image may comprise an object (x), which is subject for object detection. Thus, on that sub-frame image data feature extraction for dataset reduction may be performed. In the subsequent full-frame image a different sub-frame image may be analysed. Hence, the subsequent sub-frame images may be analysed for other detected objects, and thus, the previously detected object (x) will not be analysed before that sub-frame is again analysed. In that case a tracking algorithm may be used to track the motion of any detected features and objects in that sub-frame until that particular sub-frames sub-frame image is again being analysed.

One example could be that the full-frame image is divided into four sub-frame images. The full-frame image may be defined by a set of frame boundaries and the sub-frame images may be defined by a set of sub-frame boundaries. The four sub-frame images may overlap by their sub-frame boundaries.

For each full-frame image, only one sub-frame image may be analysed according to the method for obtaining a reduced dataset, while the other three sub-images may only be processed to a minor degree. For the subsequent full-frame image, a different sub-frame image may be analysed, such that in a sequence of four full-frame images, all four sub-frame images have been analysed. For the fifth full-frame image the sequence begins again.

In the case where one sub-frame image, e.g. sub-frame image 1, is analysed according to the method for obtaining a reduced dataset, and where one or more objects are detected, the detected objects may only be tracked in the three subsequent images by use of object tracking. Thus a minor degree of processing in that sub-frame image is performed. In the case where no objects are detected, in e.g. sub-frame image 1, no further processing of the subsequent three sub-frame image 1 may be performed.

One effect of this embodiment may be that by using a steady frame-rate it may be achieved to keep track of detected objects also when in motion. One advantage may be a limited and steady requirement for processor power.

An object of the invention may be achieved by a computer vision detection algorithm, comprising instructions to cause the sensor unit to execute the act of the method of performing object detection in a pre-processed image by extracting object features from the pre-processed image.

One effect of this embodiment may be that the object detection may be performed independently of the data feature extraction. This may be advantageous in regard to the specific use of the object detection. Information from the performed object detection may subsequently be used in the data feature extraction. Alternatively, the information from the performed object detection may simply be combined with the extracted data features in the reduced dataset. As yet another alternative, the dataset comprising information of the performed object detection may be transmitted and/or used independently of the reduced dataset comprising the extracted data features.

An object of the invention may be achieved by a gateway processor comprising means adapted to execute the acts of the method performed in the gateway processor comprising gateway communication means.

The means may be processor means such as CPU, GPU, FPGA, ASIC or similar types.

One effect of the gateway processor may be to provide for a unit to be used in a distributed networked architecture where the gateway processor acts as a separate server node. This server node may be a simple server node which distributes the data to other units or systems, or the gateway processor may act as an intelligent server node for performing further analyses on the received reduced dataset.

An object of the invention may be achieved by a machine learning algorithm comprising instructions to cause the gateway processor to execute the act of the method of performing object recognition in a reduced dataset comprising extracted data features.

One effect of this embodiment may be to use the gateway processor as an intelligent server node to perform further analyses on the received reduced dataset. It may be advantageous in regard to achieving more detailed object detection and/or recognition. This analysis may further result in data to be used for space management, to be referred to as management data.

The machine learning may be implemented by use of SVM, KNN, rCNN or similar methods.

An object of the invention may be achieved by computer program products comprising instructions, which, when the program is executed by a computer, cause the computer to carry out one or more of the computer-implemented method acts.

This embodiment may have the effects and advantages in line with those previously described in connection with the use of sensor units for detecting objects, performing DFE of the detected objects and transmitting a reduced dataset with the benefits of privacy and low bandwidth requirements.

An object of the invention may be achieved by computer-readable media comprising instructions which, when executed by a computer, cause the computer to carry out one or more of the computer-implemented method acts.

One computer-readable medium may be connected to a sensor unit and one computer-readable medium may be connected to the gateway processor.

The instructions to be carried out may be comprised in or output from the algorithms, in a computer program product comprising one or more of the computer-implemented method acts or a combination hereof.

One computer-readable medium may be connected to or comprised in each sensor unit and gateway processor for implementing and executing one or more of the described algorithms in one device. This embodiment further supports the effects and advantages of the algorithms as described above.

An object of the invention may be achieved by a vision system for object detection comprising a gateway processor being connected to a computer-readable media comprising one or more computer program products. The vision system may further comprise one or more sensor units, each sensor unit being connected to a computer-readable media comprising one or more computer program products and each sensor having sensor communication means adapted for transmitting a reduced dataset to the gateway processor. The vision system may be adapted for executing the acts of the described method.

The vision system provides for a distributed network architecture where the sensor unit acts as a separate node where the image acquisition and initial feature extraction are performed and where the gateway processor acts as a server node where further analysis may be performed, or a server node where the received dataset may be further distributed for further analysis. Thus one effect is obtaining a system which extracts crucial datasets from raw image data, and which can be used to determine object classification and recognition, but where the transmitted dataset cannot be used to reconstruct the original image which was acquired from the camera.

In accordance with the previously described embodiments of the method, the information of the used data feature extraction method is not shared between the single units comprised in the system, thereby making it impossible to reconstruct the original image as the used data feature extraction method is not outside the sensor unit.

The advantages of such a vision system may be a system with distributed network architecture, with reduced network bandwidth, with build-in data privacy due to the character of the reduced dataset.

The further effects of the vision system may include one or more of the benefits previously described for the method, devices and/or algorithms such as reduced processor power for the initial processor power which may be advantageous in regard to using common or off-the-shelf sensor units in the system. A further effect may be a vision system using open source platforms for the algorithms, thereby achieving building a distributed network architecture using common and freely available programming platforms.

The networked architecture of the vision system may be based on LAN, WLAN, Bluetooth or a similar type of connection.

In one embodiment the vision system may be adapted to be operated in two or more states with an associated configuration of the method acts and algorithms to be executed.

State may be a mode of operation. A change from one state to another, in which the vision system is operated, may be changed by a detected object, a time schedule provided to the vision system, a measured parameter from external sensors or comparable items. Furthermore, the change of state may be dependent on the present state of the system.

E.g. a detected object or a combination of objects in this connection may be an indication of an action taking place in the inspected area: A detected cup and a face may indicate that a meeting is taking place, and the state may change from idle state to meeting state. A later detected cup but with no detected face may indicate that the meeting is over and the state may change from meeting state to cleaning state.

Alternatively, a heat change measured in an inspected room may indicate that a group of people is present in the room. This may be combined with a time span, which indicates that the group of people are gathered in the room for a longer period, which may again cause a change in state from idle to meeting.

Or a time schedule for activities in an inspected room may be provided to the system, and the vision system may change state according to this schedule. This may again be combined with detected objects, combinations of objects or number of objects to determine the state in which the vision system is to be operated.

The sensor units may be operated in low-power states, either by reduced-complexity vision algorithms dedicated for low-power states, by coupling with other sensor units that share a field of view. Alternatively, the sensor units may be combined with other types of sensors in the environment, e.g. IR sensors, microphones, etc.

One example may be idle state where a reduced-complexity vision algorithm may be executed which only executes partially processing of images for object detection in areas, where there is a high probability of object appearance. Another example of reduced-complexity algorithms for idle states may be using a lower frame rate, lower resolution and/or single channel. This is only stated as examples and should be reads as such.

Another example of states in which the vision system could be operated could include a cleaning state. In such a state, the objects to be detected may be the distance between items e.g. the distance between a chair and a table. Other objects to be detected may be alien items not to be present in the area e.g. cups and papers on a meeting table. Further, other objects to be detected may the position, orientation or state of an item e.g. the position of a curtain, the orientation of the opening of a cup, papers comprising text. Such detected objects may indicate that a room has not been cleaned. Similar to the idle state, the cleaning state may also include operation of the vision system with reduced-complexity algorithms using a lower frame rate, lower resolution and/or single channel.

Yet another example of states in which the vision system could be operated, could include a meeting state. In such a state the objects to be detected may be the number of participants, their orientation, their location, the length of the meeting, intervals between openings of the doors and/or other relevant objects. Such a state may require an operation of the vision system with high-complexity algorithms using a high frame rate, high resolution and/or multiple channels.

The benefit of operating the vision system in different states may be to adapt the use to the vision system to the actual use of the areas covered by the vision system, there-by adapting the used processor power and storage of the system to a minimum.

In one embodiment of the vision system, the gateway processor may be comprised in a sensor unit.

This may be referred to as a vision system with a meshed network or a gateway-free vision system. The most basic form of such a system may be a two-sensor-unit-system that acts as master-slave in which the master sensor unit may be responsible for parts of the acts assigned to the gateway processor in the system. More generally, data may be processed at the vertices of a mesh, i.e. the sensor units, and pre-processed data may then be propagated in the meshed network along it edges. Temporal and spatial coordination of nodes in a meshed network may be performed along the edges of the mesh. The nodes in the vision system may be the sensor units. This may be a "distributed coordination" of the nodes. In this case time may be coordinated through diffusion algorithms, while mutual spatial coordination at the two ends of each edge may be sufficient. In this operation, pre-processed data at each sensor unit may be shared with its connected sensor units. The mutually processed data along each edge may then be diffused to the sensor units' neighborhoods. An example of such an operation may be a corridor covered by a set of sensor units that may have shared regions with their neighboring units, e.g. one node (node 1) may cover one end of the corridor and share a part of its field of view with another node (node 2), which covers the middle part of the corridor. Furthermore, a third node (node 3) may cover the other end of the corridor, and share a part of its field of view with node 2 covering the middle part of the corridor. In a case where the tracked person is in the shared field of view of node 1 and node 2 and moves toward node 3, the diffused information from node 2 to node 3 can "alert" node 3 (or any connected nodes) to exit low-power mode of operation and perform high-sensitivity detection and tracking algorithm, even before the person arrives at the field of view of node 3.

An object of the invention may be achieved by use of the vision system comprising at least two sensor units wherein a first sensor unit is operated with a field of view being separate from a second sensor unit's field of view.

One effect of this embodiment may be to track an object across sensor units by extracted object features detected by the individual sensor units. This may be beneficial in regard to sparsely located sensor units. Another advantage may be that an object may be tracked on locations with opaque obstacles such as walls or pillars and in locations with a low ceiling height.

In an embodiment of the vision system comprising at least two sensor units, the Angle estimation and/or Distance estimation may be used for self-calibration of the vision system. The gateway may act to coordinate distributed sensor units, both in time and space. This is a "centralized coordination" of the nodes. Temporal coordination of the distributed sensor units (time-synchronization) provide the ability to merge the processed data from multiple sensor units with better accuracy and robustness. Accuracy comes from better identification and matching of the redundant data, and robustness is a result of the associated redundancy. The gateway may perform time-synchronization in master-slave mode with each sensor unit, or in broadcast mode for the whole network. Spatial coordination of the distributed sensor units results in the ability to map or stitch the data from various sensor units to the physical layout that is covered by aggregation of all the sensor unit's fields of view.

The placement of sensor units in a distributed system may not be fully known beforehand. The gateway may perform spatial coordination by deducing relative geometries of the sensor units from their pixel correspondence; only the pre-processed data from the sensor units may be used in such a process to maintain privacy. The spatial coordination may be performed either in a dedicated "multi-sensor spatial calibration" session, or during "on-the-fly (re)coordination".

The objective of a dedicated spatial calibration session may be to estimate, as accurately as possible, the placement of the distributed sensor units in terms of location and orientation (relative or with regard to a global reference) of distributed sensor units. The objective of on-the-fly re-coordination is to maintain or improve the accuracy in relative localization and orientation of distributed sensor units, using data that is obtained as a side-product of normal operation, e.g. pre-processed data from tracking sessions of multiple time-synchronized sensor units can be used to geometrically re-coordinate the units in space.

Items

In a further embodiment, the method, using the vision system comprising two or more sensor units, may comprise the further acts performed in the gateway processor of monitoring the operation status of the sensor unit, and distributing data from a first sensor unit to at least a second sensor unit. The first sensor unit performs at least the acts of:

acquiring an image from an camera, and
   performing image pre-processing on the acquired image to generate a pre-processed image.

The second sensor unit performs one or more of the acts of:

performing object detection in the pre-processing image using a computer vision detection algorithm,
   performing data feature extraction on the pre-processed image using a computer vision DFE algorithm to generate a reduced dataset comprising extracted data features, or
   transmitting the reduced dataset to a gateway processor.

This item may be referred to as Distributed edge computing.

One effect of this method may be to achieve an intelligent system of interconnected sensor units that can be used to distribute the computational load from performing feature extraction and other non-time sensitive tasks. The gateway processor keeps track of which sensor units are active and which are idle and makes use of the processor power in the individual sensor units by requesting the active sensor units to distribute data for processing to idle sensor units thereby distributing the computational load on the active sensor units. This may be advantageous in regard to harnessing the distributed processor power in the sensor units of the system for image processing. However, using this method may reduce the level of data privacy of the data transmitted between the sensor units within the system.

This embodiment of Distributed edge computing may cause a lowering of the privacy level in the use of the vision system. In case this embodiment does not provide for a sufficient privacy level, in this use, an improved privacy level should be provided for by other means.

In a further embodiment, the method, using the vision system comprising two or more sensor units, may comprise the further acts of approximating a first object-camera-di stance to a detected object in a first pre-processed image,
   approximating a second object-camera-distance to a detected object in a second pre-processed image,
where the first pre-processed image captures a first scene, and the second preprocessed image captures a second scene which completely or partly overlaps the first scene, and
   using the first and second object-camera-distances to validate that the detected object in the first and second pre-processed image is the same object.

This item may be referred to as Mitigation of doublets.

This embodiment may have the effect of mitigating the appearance of doublets of objects when the reduced datasets are further analysed after being transmitted from the sensor units. This is advantageous in regard to an increased quality of the system and thus increased reliability to the system.

Use of multiple sensor units may provide a vision system covering a large area. This may be achieved because the individual scenes captured by each sensor unit may only overlap in minor areas thereby covering a large area. Accordingly, an increase in the number of sensor units may thus have the advantage of increasing the covered area.

Alternatively, use of multiple sensor units may provide a vision system imaging a scene from multiple directions and/or angles. It may thereby be achieved to image one or more objects from several angles and/or with an increased level of detail. Accordingly, an increase in the number of sensor units may thus have the advantage of increasing the level of detail of improved object detection.

In general, the use of multiple cameras may have the advantage of achieving an increased robustness of the vision system. Increasing the number of sensor units may thus further increase the robustness.

In a further embodiment, the method may comprise the further acts of:

extracting object data from one or more reduced datasets fed into a machine learning model executing a machine learning algorithm to perform object detection and/or object recognition on the reduced dataset(s), and
   transmitting the object data to a management server.

This item may be referred to as Management data.

This embodiment may have the effect that exacted data of the use of the imaged premises may be retrieved. Such data may be beneficial in regard to space management, surveillance/inspection of activities which may be used for optimized use of the premises, or better adjustments of the activities associated thereto.

As an example, the embodiment could be used for space management of an office building where the management data could be the number of cars on the parking space or the number of people using the meeting facilities and the offices. The management data could be used for adjusting the need for cleaning, the need for heating or cooling of the offices and meeting facilities. The space management could also be used for renting out parking facilities if there is a general surplus at given times or lending out meeting facilities for external uses. The space management could be used for up- and/or downscaling of building facilities.

In a further embodiment, the vision system may comprise means adapted to execute the further acts of the methods described in the items (Distributed edge computing, Mitigation of doublets and Management data) and further comprising a management server configured with a management system adapted for receiving object data from the gateway processor.

This embodiment has the effect that the vision system may be extended to include the functions of distributed edge computing, mitigation of doublets and obtaining management data using only an extra management server and adopted algorithms. This embodiment of the vision system may have the further effects and advantages already described above in connection with the functions of distributed edge computing, mitigation of doublets and obtaining management data.

In a further embodiment, of the vision system, one or more sensor units are adapted for being operated in a fixed position.

One effect of this embodiment is that the vision system may not use any movable parts. Moveable parts are often a subject to increased wear and tear, and thus require regular maintenance. This may advantageously be avoided using sensor units in fixed positions.

| Detailed Description of the Invention | |
| --- | --- |
| No | Item |
| 10 | Vision system |
| 20 | Sensor unit |
| 22 | Sensor communication means |
| 24 | Camera |
| 26 | Pre-processor means |
| 28 | Camera parameter |
| 30 | Gateway processor |
| 32 | Gateway communication means |
| 40 | Management server |
| 42 | Object data |
| 50 | Computer program product |
| 52 | Computer-readable medium |
| 60 | Acquired image |
| 62 | Full-frame image |
| 64 | Sub-frame image |
| 70 | Pre-processed image |
| 80 | Reduced dataset |
| 90 | Detected object |
| 92 | Pixel object height |
| 94 | Physical object height |
| 96 | Object-camera distance |
| 97 | Object-camera angle |
| 100 | method |
| 110 | acquiring |
| 112 | performing |
| 114 | transmitting |
| 116 | receiving |
| 118 | obtaining |
| 120 | generating |
| 122 | feeding |
| 124 | comparing |
| 126 | approximate |
| 130 | Pre-processing |
| 140 | object detection |
| 142 | Object feature |
| 150 | Object recognition |

-continued

| Detailed Description of the Invention | |
| --- | --- |
| No | Item |
| 160 | Object tracking |
| 180 | Object classification |
| 190 | Data feature extraction (DFE) |
| 192 | extracted data features |
| 210 | Computer vision detection algorithm |
| 220 | computer vision DFE algorithm |
| 240 | Machine learning algorithm |
| 242 | Machine learning model |

Figure 1:
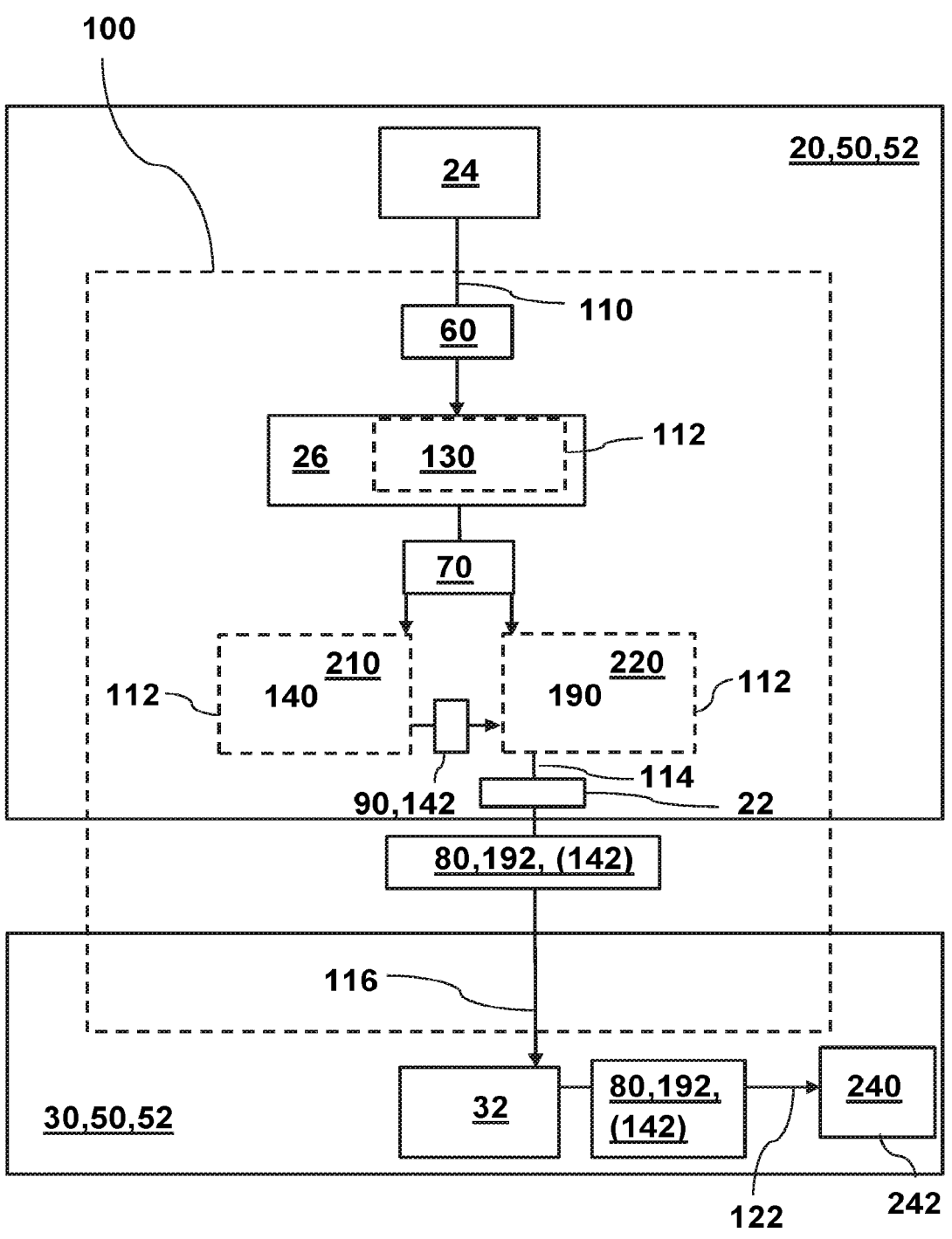
FIG. 1 illustrates one embodiment of the method for object detection.

FIG. 1 illustrates one embodiment of the method 100 for object detection 140. The method 100 comprises a number of acts. In connection with some of the steps intermediate products are illustrated. The method 100 is illustrated by a dotted line surrounding the method acts. The method acts are likewise illustrated by dotted lines. The intermediate products are illustrated by solid lines as are the units in which the acts are performed. The units include a sensor unit 20 comprising a camera 24 and a gateway processor 30 comprising gateway communication means 32. The camera 24 acquires 110 an image 60. A method act of performing 112 image pre-processing 130 is performed on the acquired image 60 thereby obtaining a pre-processed image 70. The pre-processing is performed using the pre-processor means 26.

The pre-processed image 70 is used for performing 112 object detection 140. The object detection 140 is performed using a computer vision detection algorithm 210. In another method act of performing 112 data feature extraction 190 a reduced dataset 80 is generated. The data feature extraction 190 is performed using a computer vision DFE algorithm 220. The pre-processed image 70, information from the performed object detection 140, and object features 142 are used in the computer vision DFE algorithm 220 to generate the reduced dataset 80 comprising extracted data features 192. The reduced dataset 80 is transmitted 114 from the sensor unit 20 to the gateway processor 30 using the sensor communication means 22. Optionally object features 142 may also be transmitted to the gateway processor 30 either as separate date or comprised in the reduced dataset 80. In the gateway processor 30, the reduced dataset 80 is received 116 using the gateway communication means 32.

FIG. 1 further illustrates an embodiment wherein the gateway processor 30 is configured with a machine learning model 242 configured to execute a machine learning algorithm 240 comprising instructions to cause the gateway processor 30 to execute the act of the method of performing object recognition. The reduced dataset 80, extracted data features 192 and optionally object features 142 are fed 122 into the machine learning model 242.

The gateway processor 30 and the sensor unit(s) 20 may each comprise a computer program product 50 comprising instructions, which, when executed by a computer, may cause the computer to carry out one or more of the illustrated method acts.

Figure 2:
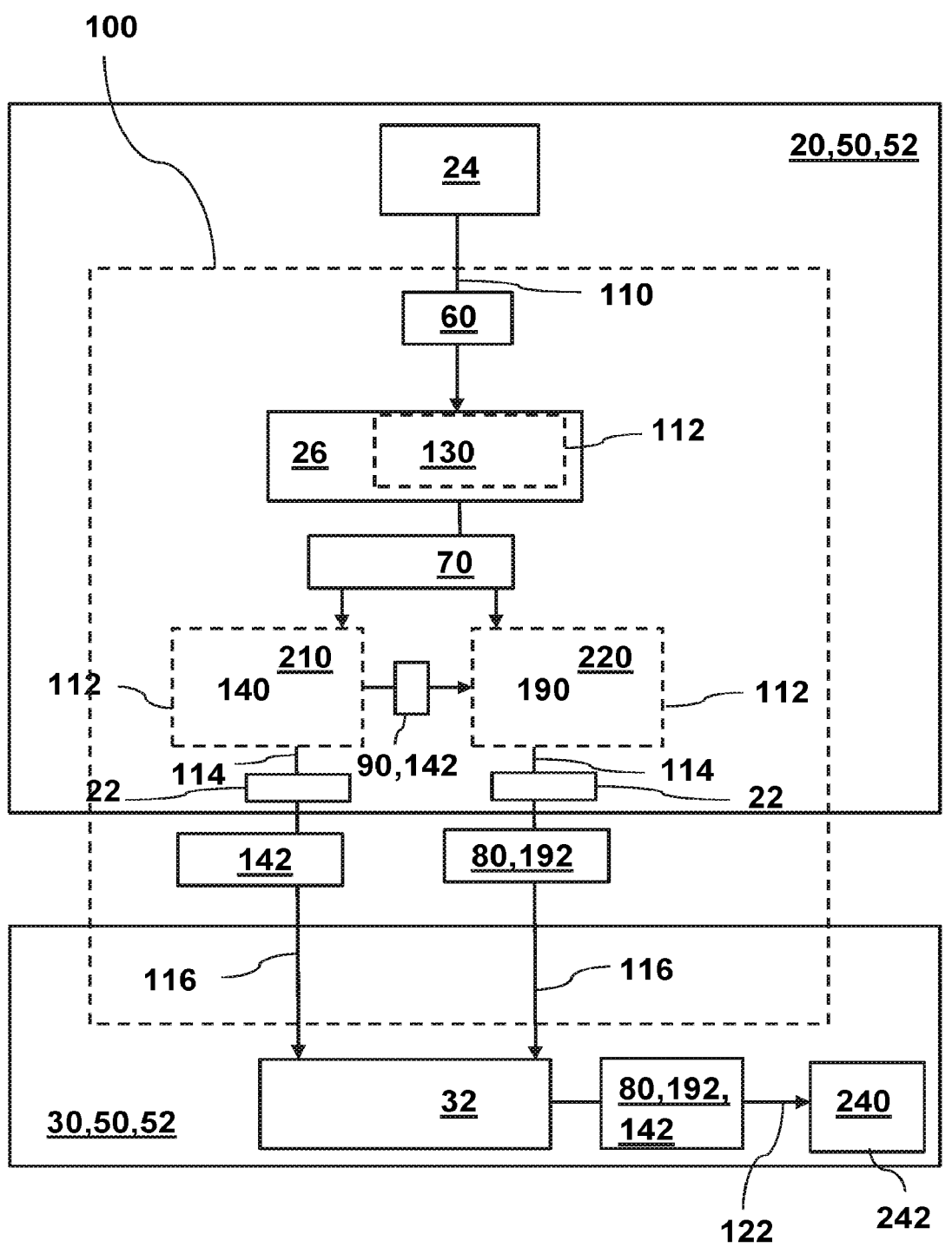
FIG. 2 illustrates another embodiment of the method for object detection.

The gateway processor 30 and the sensor unit(s) 20 may each comprise a computer-readable medium 52 comprising instructions which, when executed by a computer, may cause the computer to carry out one or more of the illustrated method acts. FIG. 2 illustrates another embodiment of the method 100 for object detection 140. Aspects from the previous FIG. 1 may also pertain to the details disclosed in this embodiment. The difference between the two embodiments concerns the use of the object features 142. In this embodiment, the object features 142 are transmitted 114 to the gateway processor 30 for further processing or analyzing. In the gateway processor 30, the reduced dataset 80 and the object features 142 are received 116 using the gateway communication means 32.

FIG. 2 further illustrates an embodiment wherein the gateway processor 30 is configured with a machine learning model 242 configured to execute a machine learning algorithm 240 comprising instructions to cause the gateway processor 30 to execute the act of the method of performing object recognition. The reduced dataset 80, extracted data features 192, and object features 142 are fed 122 into the machine learning model 242.

Figure 3:
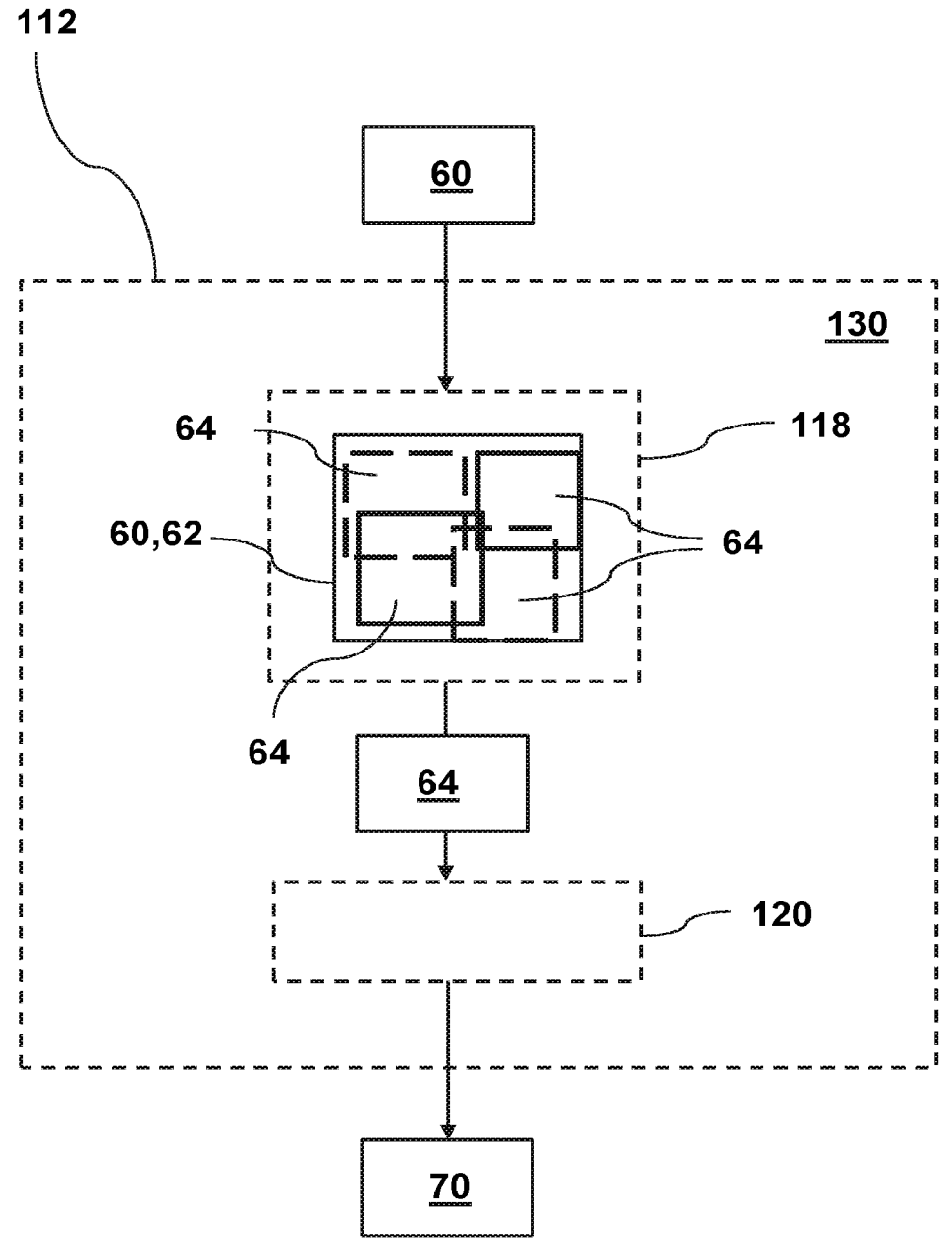
FIG. 3 illustrates one embodiment of the method acts of image pre-processing.

One embodiment of the method acts of image pre-processing 130 is illustrated in FIG. 3. The method acts are performed 112 on the acquired image 60. The method acts are illustrated by dotted lines. The intermediate products are illustrated by solid lines. In the pre-processing 130 the acquired image 60 is received as a full-frame image 62. One or more sub-frame images 64 are obtained 118 within the full-frame image 62. The full-frame image 62 is thus divided into a number of sub-frame images 64. For this embodiment the full-frame image 62 is divided into four sub-frame images 64. The sub-frame images may be defined by a set of sub-frame boundaries. The sub-frames may be generated such that the sub-frame boundaries of the different sub-frame images overlap. One or more of the sub-frame images 64 may be further preprocessed for generating 120 a pre-processed image 70.

Figure 4:
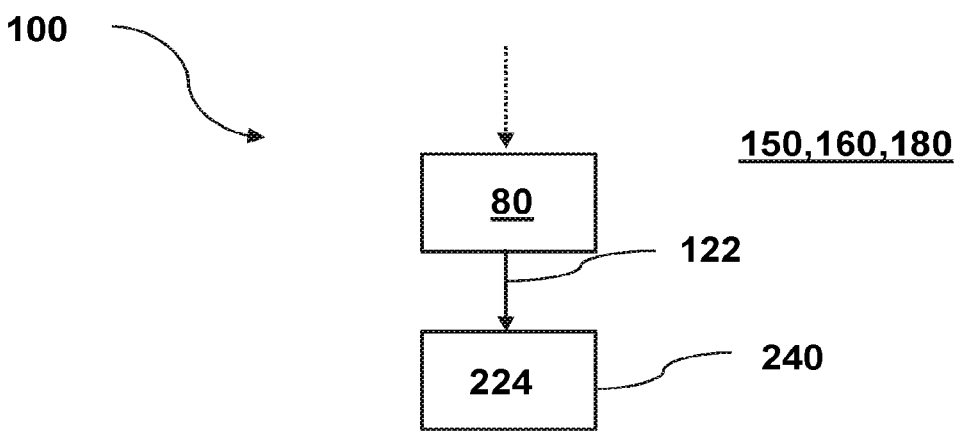
FIG. 4 illustrates another embodiment of the method for object detection.

FIG. 4 illustrates one embodiment of an act which may be performed in the gateway processor 30 performing object recognition 150, object classification 180 and/or object tracking 160 by feeding 122 the reduced dataset 80 into a machine learning model 242. The machine learning model 242 may execute a machine learning algorithm 240 adapted to perform object recognition 150, object tracking 160 and/or object classification 180 based on the reduced dataset 80. The act may be comprised in the method 100 as an additional act. Especially the illustrated act may be inserted in the embodiments illustrated in FIGS. 1 and 2.

Figure 5A:
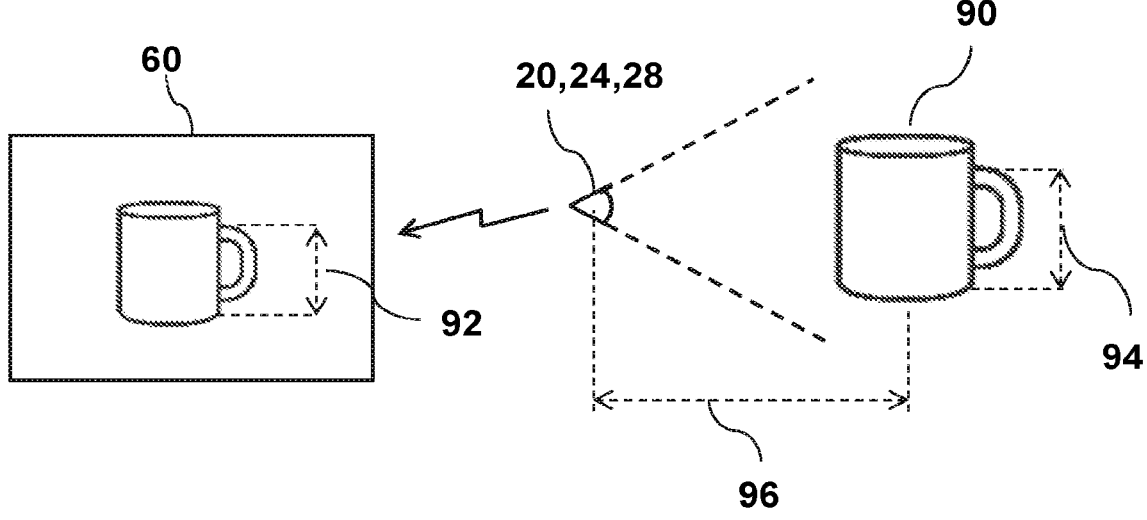
FIGS. 5A and 5B illustrate one embodiment of parameters and a method for estimating the object-camera distance.
Figure 5B:
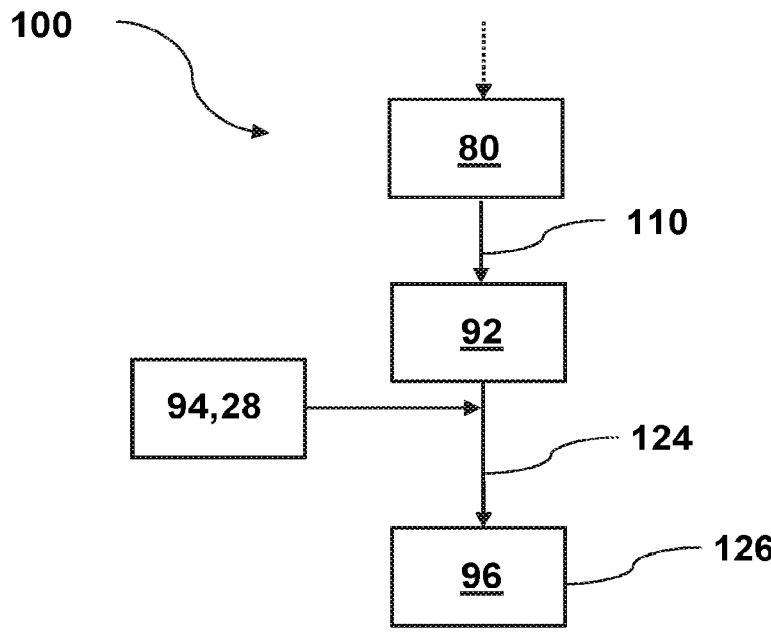

FIG. 5B illustrates an embodiment of method acts which may be performed in the sensor unit 20 and/or in the gateway processor 30 estimating the object-camera distance 96. Estimating the object-camera distance 96 may be performed by acquiring 110 a pixel object height 92 of a detected object 90 from the reduced dataset 80. A further act of comparing 124 the pixel object height 92 with tabulated physical object height(s) 94 and tabulated camera parameter(s) 28 may be performed to approximate 126 the distance of the detected object(s) 90 to the camera 24 being the object-camera distance 96.

FIG. 5A illustrates the heights and distances used in the method. An image 60 is acquired by the camera 24 in the sensor unit 20. The sensor unit may be defined by tabulated camera parameter(s). The tabulated camera parameter(s) may be stored in the sensor unit 20 or in the gateway processor 30. The detected object 90 in this embodiment is illustrated to be a cup, which is only an example and should literally only be perceived as such. The tabulated physical object height(s) 94 for a cup may be the distance from the bottom of the cup to the point where the upperpart of the handle is connected to the cup itself The pixel object height 92 of the cup is acquired from the reduced dataset 80. As this distance may be a distinct feature for detecting a cup, this may be comprised in the reduced dataset 80. From the two heights, the distance 96 from the camera to the object may be approximated. Here the distance is illustrated as the centre point of the sensor to the centre point of the cup. Other distances may be used e.g. from the camera lens to the closest point of the cup facing the camera.

Figure 6A:
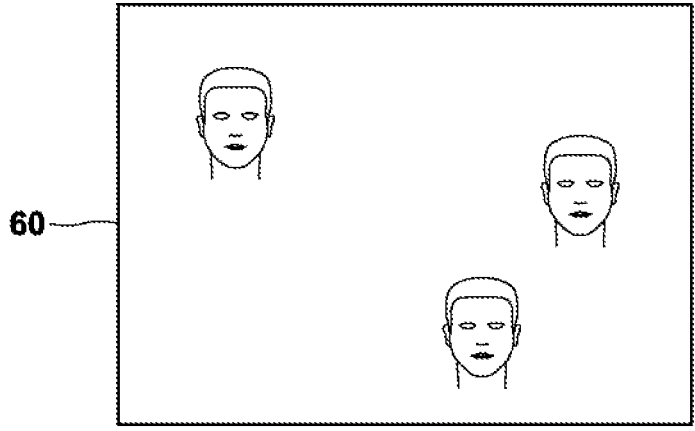
FIGS. 6A and 6B illustrate one embodiment of object tracking.
Figure 6B:
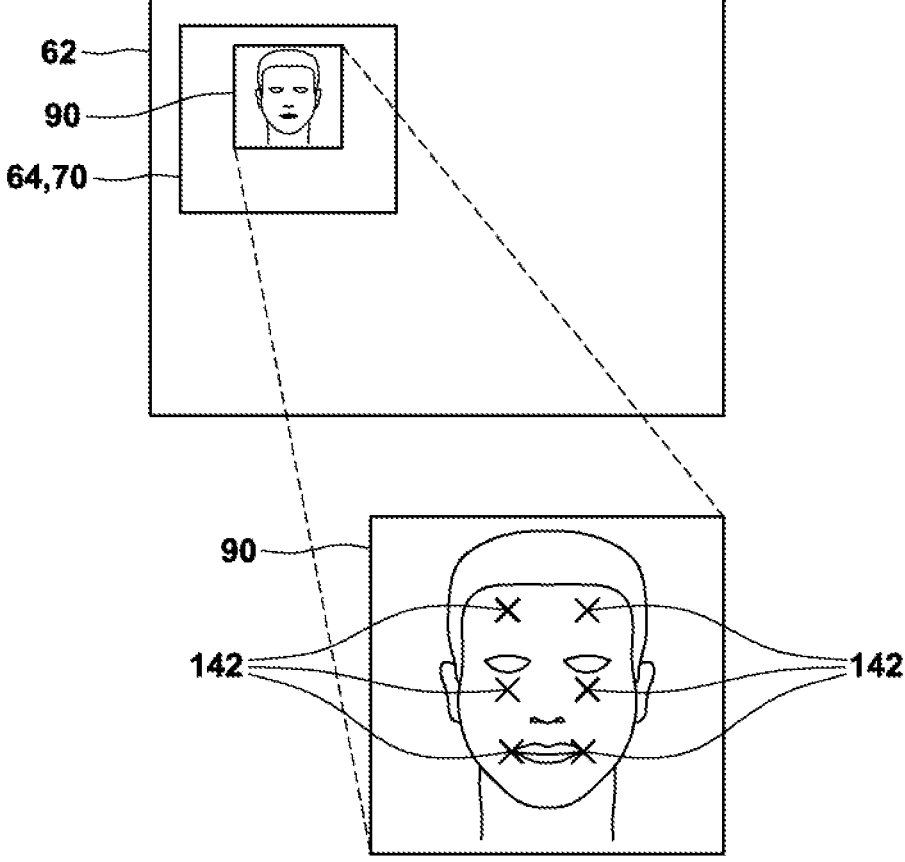

One embodiment of object tracking is illustrated in FIG. 6. The object tracking may also be referred to as feature tracking as the object tracking may be performed by tracking object features 142. In this embodiment, the detected object 90 to be tracked is a face. FIG. 6A illustrates an acquired image 60 in which three faces are present. FIG. 6B illustrates the acquired image 60 or full-frame image 62 comprising a sub-frame image 64. The sub-frame image may be one amongst several sub-frame images comprised in the full-frame image. The sub-frame image 64 is pre-processed such that a pre-processed image 70 is obtained, and in which the detected object 90 is a face. The face may be detected as a face or as a collection of features such as eyes, nose, mouth etc. For the object tracking, the object features 142 may be used. The object features in the illustrated embodiment is illustrated by X's and are here chosen as the corners of the mouth, two points on the forehead and the cheeks. Using the object features instead of the face as the objects to be tracked has the effect that when the face is turned, e.g. by 90 degrees, some of the object features are still visible in the image, whereas the face for detection is no longer completely visible. This may be advantageous in regard to improved detection of the object, even when it is rotated or is partly covered by another object partly covering the object to be tracked.

The object tracking may thus be performed by tracking object features 142. The object tracking may be performed by performing only a minor degree of analyzing of the subsequent sub-frame images where only the object features are tracked and the sub-frame image is not analysed for new objects. For the subsequent full-frame images the other sub-frame images may be successively analysed.

Using object features for tracking may aid for a further use of the method and the vision system. The object features may reveal the mood of a person by estimating the distance from the eyes to the mouth corners, a change in eye size, the change in the position of the shoulders to mention a few features which may be used.

Figure 7A:
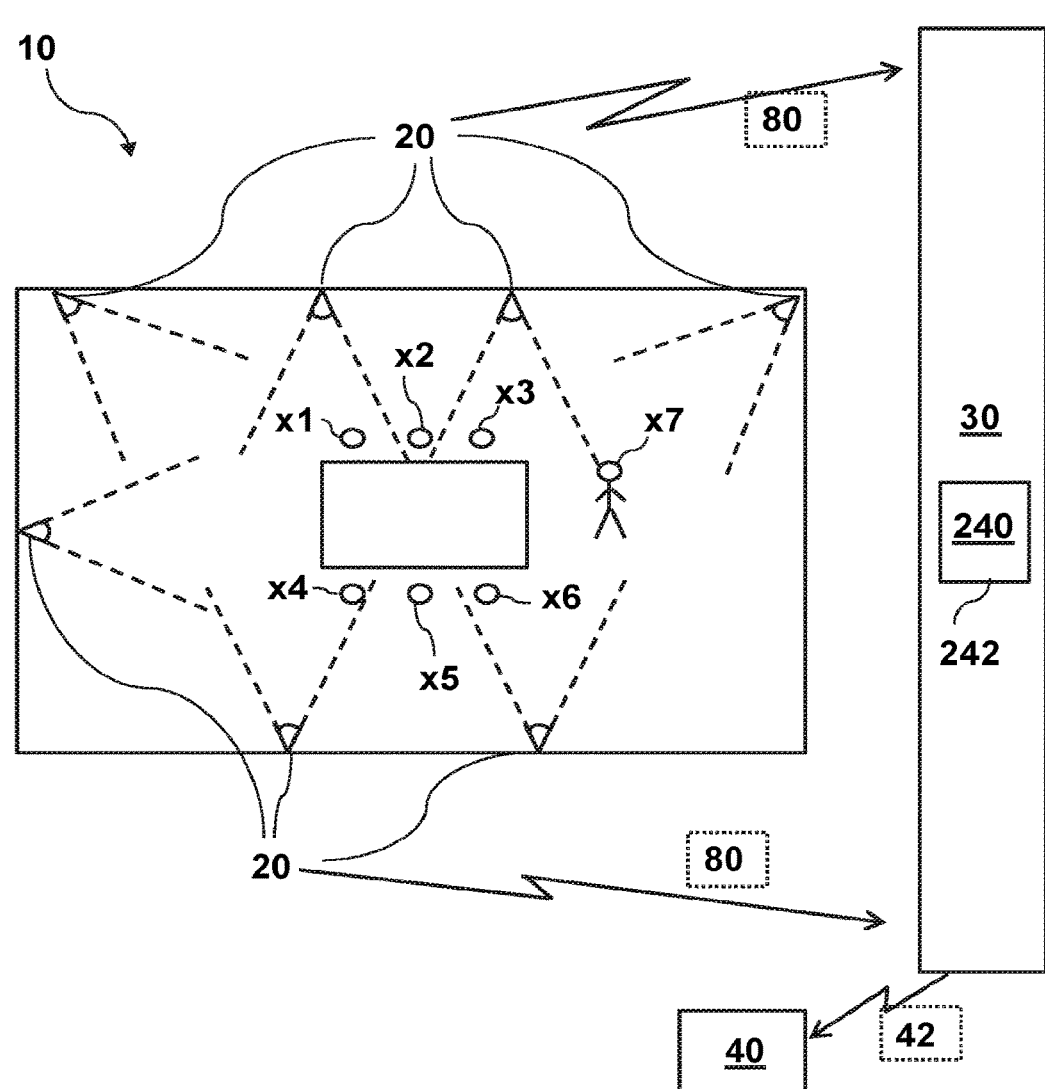
FIGS. 7A and 7B illustrate two embodiments of the vision system.

One embodiment of the use of the vision system 10 is illustrated in FIG. 7A. Seven sensor units 20 are placed in a room imaging different scenes. The illustrated embodiment is a meeting taking place in the room where seven persons x1-x7 participate. The seven participants are placed around a table. The room is illustrated with a top view as seen from e.g. the ceiling.

This embodiment illustrates the use of multiple sensor units. The illustration shows how one or more persons may be imaged by multiple sensor units each imaging a scene different from the scenes of the other sensor units. Person x4 is illustrated to be imaged by five sensor units. In the case where x4 is placed to face the table, he is imaged from the back, the side, frontally and semi-frontally. This embodiment may illustrate the item in the description of the invention referred to as Mitigation of doublets.

This illustrated embodiment may have the effect of mitigating the appearance of doublets of objects when the reduced datasets are further analysed after being transmitted from the sensor units, thereby increasing the quality and the robustness of the vision system 10.

The embodiment in FIG. 7A further illustrates a vision system comprising a gateway server 30 and a management server 40, where the sensor unit 80 transmits reduced datasets 80 to the gateway server 30, and object data 42 are transmitted from the gateway server 30 to the management server 40.

Furthermore, FIG. 7A illustrates an embodiment wherein the gateway processor 30 is configured with a machine learning model 242 configured to execute a machine learning algorithm 240 comprising instructions to cause the gateway processor 30 to execute the act of the method of performing object recognition.

Figure 7B:

Another embodiment of the use of the vision system 10 is illustrated in FIG. 7B. For this embodiment, only the placement of the sensor units 20 is illustrated. The remaining parts of the system and use hereof are as illustrated in FIG. 7A.

The room in FIG. 7B is illustrated with a side view as seen from e.g. a wall. Here two sensor units 20 are placed in a room imaging different scenes with a field of view of each sensor unit being apart from each other i.e. not overlapping fields of view.

The invention claimed is:

1. A method of object detection, identification and localization, the method including acts of:
    acquiring an image from a camera;
    generating a pre-processed image by performing image pre-processing of the said acquired image;
    detecting and identifying an object in the pre-processed image using a computer vision detection algorithm;
    extracting a feature on the detected and identified object using a computer vision data feature extraction algorithm and generating a reduced dataset that includes extracted data features;
    localizing the object; and
    approximating a distance of the detected object to the camera from the extracted data features from the reduced data set.

2. The method of claim 1, wherein the acts are performed on a single image.

3. The method of claim 1, wherein the act of the approximating the distance is performed by:
    acquiring a pixel object distance of the detected object from the reduced dataset; and
    comparing the pixel object distance with a tabulated physical object height and a tabulated camera parameter.

4. The method of claim 1, being performed in a sequence and further comprising an act of motion tracking the localized object.

5. The method of claim 1, further comprising an act of approximating an object-camera angle between a feature point in the feature and a center point in a feature plane that is parallel to an image plane of the camera.

6. The method of claim 5, wherein the acts are performed on a single image.

7. The method of claim 5, further comprising an act of combining the approximation of the distance and the approximation of angle to improve the localization of the object.

8. The method of claim 5, wherein the angle approximation is used on one object, using two sensors with overlapping fields of view and triangulation, for a more precise object location.

9. A vision system configured to perform the method of claim 5, wherein the vision system is self-calibrated based on at least two approximated angles.

10. The method of claim 1 performed by acquiring images from multiple cameras.

11. The method of claim 10 further including acts of
    approximating a first object-camera-distance to a detected object in a first preprocessed image,
    approximating a second object-camera-distance to a detected object in a second pre-processed image, where the first pre-processed image captures a first scene, and the second preprocessed image captures a second scene which completely or partly overlaps the first scene, and
    using the first and second object-camera-distances to validate that the detected object in the first and second pre-processed image is the same object.

12. The method of claim 10 further including an act of estimating an orientation of the object.

13. A vision system configured to perform the method of claim 10, wherein the vision system is self-calibrated based on at least two approximated distances.

14. A vision system configured to perform the method of claim 10, wherein the vision system is self-calibrated based on at least two approximated angles.

15. The method of claim 10, further including an act of time-synchronization of acquiring a plurality of images.

16. The method of claim 10, further including an act of spatial coordination of acquiring cameras by deducing relative geometries of the cameras from their pixel correspondence.

17. A sensor unit configured to perform the acts of claim 1.

18. The sensor unit according to claim 17 further comprising sensor communication means arranged for transmitting detected, identified and localized object data.

19. A vision system comprising one or more sensor units according to claim 17.

*     *     *     *     *